United States Patent

[11] 3,624,622

[72] Inventor Di Chen
Minnetonka, Minn.

[21] Appl. No. 850,571
[22] Filed Aug. 15, 1969
[45] Patented Nov. 30, 1971
[73] Assignee Honeywell, Inc.
Minneapolis, Minn.

[54] OPTICAL INFORMATION STORAGE SYSTEM
8 Claims, 3 Drawing Figs.

[52] U.S. Cl. .......... 340/174 YC, 340/174.1 M, 346/74 MT, 148/121, 340/174 TF
[51] Int. Cl. .......... G11c 11/14, G11c 11/42, G02f 1/22
[50] Field of Search .......... 340/174 YC, 174.1 M; 346/74 MT; 148/120, 121, 122, 31.55, 31.57

[56] References Cited

UNITED STATES PATENTS

| | | | |
|---|---|---|---|
| 3,368,209 | 2/1968 | McGlauchlin | 340/174.1 |
| 3,189,493 | 6/1965 | Chen | 148/120 |

*Primary Examiner*—James W. Moffitt
*Attorneys*—Lamont B. Koontz, Francis A. Sirr, Robert O. Vidas and Thomas L. Johnson

ABSTRACT: An information storage system in which bits of information are stored on quenched high-temperature phase magnetic film by utilizing a laser to heat the film above it's high-temperature phase Curie point. The laser beam is attenuated to provide nondestructive readout utilizing either the magneto-optic Kerr or Faraday effects.

INVENTOR.
DI CHEN
BY Robert O. Vidas
ATTORNEY.

OPTICAL INFORMATION STORAGE SYSTEM

BACKGROUND OF THE INVENTION

The present invention relates to a method and system for optically storing information. More particularly, the present invention relates to a method and system for providing optical information storage wherein the medium upon which the "-bits" of information are stored is a quenched high-temperature phase magnetic film.

Information storage systems which provide high density information storage are much in demand. Basically, the need for such systems has been created by the expansion of computer usage into areas placing extensive requirements on the computer's storage facilities. In meeting this demand, optical information storage on magnetic film is highly desirable since it provides high density storage and rapid access to the stored information. Information storage on magnetic film has been achieved by a number of different schemes. The most advantageous scheme utilizes a laser to provide Curie point writing. Such a technique was disclosed and claimed in U.S. Pat. No. 3,368,209 to L. D. McGlauchlin et al. and assigned to the same assignee as the present invention.

One difficulty with the scheme disclosed in the above-mentioned McGlauchlin et al. patent is that magnetic films, such as manganese bismuth, produce a leakage light signal after repeated write-erase cycling of the film. This leakage light signal has been found experimentally to occur after as few as 100 write-erase cycles. Generally, this effect saturates and stabilizes causing a reduction in the contrast between background and the written "bit" readout signals. Although the McGlauchlin et al. scheme is advantageous in comparison to other prior art optical memory schemes, the present invention eliminates the leakage light signal problem and provides further advantages not found in the prior art.

SUMMARY OF THE INVENTION

The information storage method and system of the present invention utilizes quenched high-temperature phase magnetic film to provide several distinct advantages not found in the optical information storage systems of the prior art. First, it has been found experimentally that the reduction in contrast between background and the written "bit" readout signals is caused by the written portions of the film being transferred into the high-temperature phase as a result of repeated write-erase cycles whereas the unwritten portions of the film remain in the low-temperature phase. Operation entirely in the quenched high-temperature phase, as provided by the present invention, achieves maximum contrast since the entire film retains the same crystallographic phase. Secondly, quenched-phase magnetic film has a lower curie temperature as compared to a low-temperature phase magnetic medium. This allows a substantially lower intensity light beam to provide writing on the magnetic film. Alternatively, the same intensity light beam can write on a larger portion (spot) of the magnetic film thereby increasing the signal-to-noise ratio in the "reading" phase of operation. Thirdly, the magnetization of a quenched-phase magnetic medium is reduced. As a result, the magnetic field required to provide complete erasure of stored information is reduced. Fourthly, a quenched high-temperature phase magnetic film has an increased coercive force. This results in a higher margin between the field required to provide complete erasure of a heated portion of the film and the field required to erase bits of information on nonheated portions of the film. Finally, the reduced Curie temperature for a quenched-phase film increases the margin between the writing and decomposition temperatures.

To achieve the above advantages, the present invention includes an energy source for providing energy of an intensity level sufficient to heat a predetermined portion (spot) of a quenched-phase magnetic film above the film's quenched-phase Curie temperature. The system further includes means to direct the energy to the predetermined portion of the film. Upon cooling of the magnetic film below the quenched-phase Curie temperature, a change in the magnetic properties of the heated portion occurs. By selectively changing the film's magnetic properties in a spot by spot manner, digital information is stored. Nondestructive readout of the stored information is obtained utilizing either the magneto-optic Kerr or Faraday effects.

DETAILED DESCRIPTION OF THE PREFERRED EMBODIMENTS

For purposes of this invention, a quenched-phase magnetic film is a magnetic medium which has substantially retained its high-temperature phase crystallographic structure at a temperature below the mediums's low-temperature phase Curie point. The term magnetic medium is meant to include all materials having ferromagnetic or ferrimagnetic properties. The Curie point is the temperature at which a magnetic material looses its magnetization. For example, low-temperature (normal) phase manganese bismuth (MnBi) is ferromagnetic and has a NiAs type crystallographic structure of orthorhombic symmetry. When MnBi is heated above its low-temperature phase Curie temperature of 360° C, the medium becomes paramagnetic with a monoclinic crystallographic symmetry. See, "The Magnetic and Crystallographic Properties of MnBi Studied by Neutron Diffraction" by A. F. Anderson et al. appearing in Acta Chemica Scandinavica, Volume 21, pages 1543–1554, 1967. Utilizing the process of preparation described hereinbelow, this high-temperature phase monoclinic crystallographic symmetry is retained at ambient room temperature.

Whereas the present invention includes all magnetic media having a quenched-phase as described above, the discussion hereinbelow is limited to MnBi.

Figure 1:
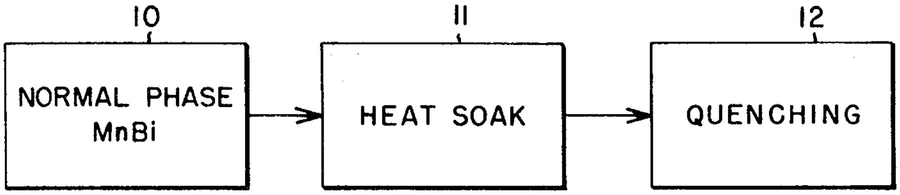
FIG. 1 is a diagrammatic illustration of a preferred process for preparing quenched-phase magnetic film.

FIG. 1 is a block diagram of a process for preparing the quenched-phase MnBi utilized in the information storage system of the present invention. The quenched-phase MnBi film is produced in a three step process. The first step, illustrated as block 10, is the preparatory step of obtaining normal low-temperature phase MnBi. Normal phase MnBi film can be prepared in any number of ways well known in the art. Preferably, it is prepared in a manner described and claimed in U.S. Pat. No. 3,539,383, entitled "Preparation of Manganese Bismith" by Di Chen et al. and assigned to the same assignee as the present invention. When prepared in the manner described in the Chen et al. patent the normal-phase MnBi films are optically homogeneous and reproducible. The second step of the quenching process is to heat the MnBi film to a temperature above the normal-phase Curie temperature (360° C). This step is shown in block 11. The heat soak is for a length of time sufficient to allow the entire film to be heated to a temperature above 360° C. The temperature to which the MnBi film is heated above 360° C is not critical. However, the film should not be heated above the decomposition temperature of 455° C. Normally, MnBi will not recover its magnetization if heated above its decomposition temperature,. Above the normal-phase Curie temperature of 360° C, MnBi undergoes a first order phase transition. As stated previously, the crystallographic structure above 360° C, is normally referred to as the high-temperature phase.

The third or quenching step is illustrated as block 12 in FIG. 1. In this step, the heated MnBi film is rapidly cooled from above 360° C. This cooling step retains the high-temperature phase crystallographic structure of the film at room temperature. In a preferred process, the MnBi film is heated in vacuum to a temperature of 400° C and then expelled from the evacuated heating chamber into a quantity of methanol sufficient to allow immersion of the film. Since methanol provides good heat conduction, rapid cooling of the MnBi film is obtained. By utilization of such a rapid cooling process, the high-temperature phase characteristics do not anneal out. MnBi prepared in such a manner is herein referred to as quenched-phase MnBi. The quenched-phase MnBi is ferromagnetic. Alternatively, MnBi can be transferred into the quenched-phase by simply heating the entire film above 360° C on a spot-by-spot basis with a laser beam. The substrate, such as glass, on which the MnBi is deposited will normally conduct sufficient heat away from the heated spot to provide the quenching action described above.

Figure 2:
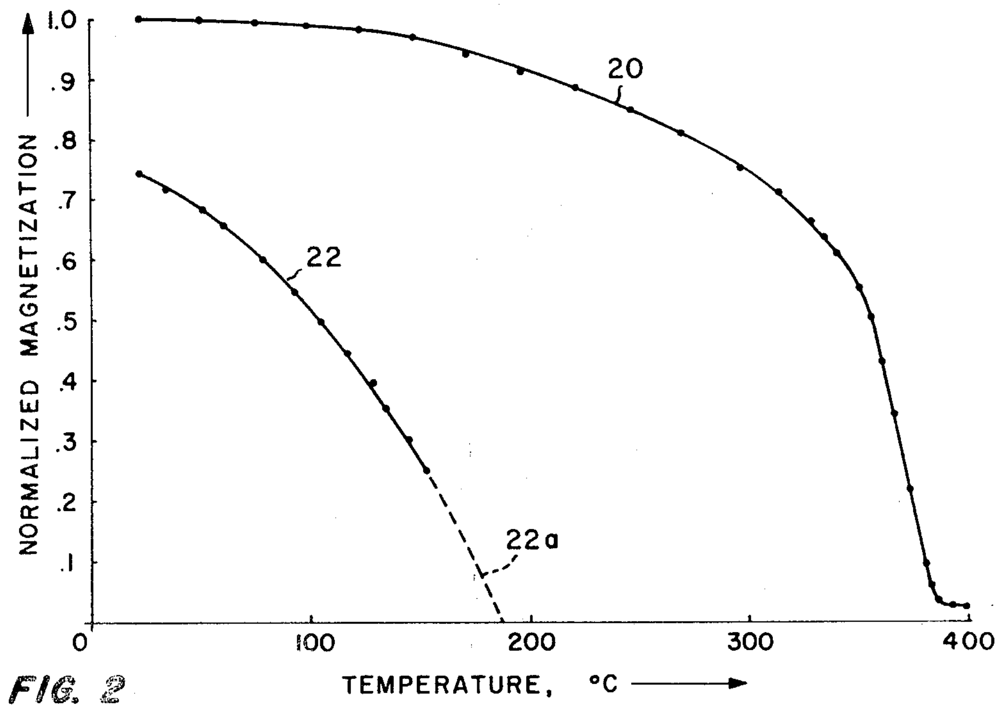
FIG. 2 is a normalized graph of temperature versus magnetization for both low-temperature phase and quenched-phase manganese bismuth films.

FIG. 2 is an illustration of a normalized magnetization curve for both normal and quenched-phase MnBi; curve 20 representing normal-phase and curve 22 representing quenched-phase MnBi. Curves 20 and 22 are drawn using data points obtained experimentally. From curve 20, it can be seen that the Curie temperature for the normal-phase MnBi is in the neighborhood of 360° C. Likewise, extrapolated curve **22*a*** illustrates that quenched-phase MnBi has a Curie temperature of approximately 180° C. This reduced Curie temperature can be utilized advantageously in a Curie point writing scheme such as described in conjunction with FIG. 3. While the stability of the quenched phase is strongly temperature dependent, the film has substantially no tendency to revert to the normal low-temperature phase at room temperature.

As can further be seen from FIG. 2, there is approximately a 25 percent reduction in room temperature magnetization in the quenched-phase as compared to normal-phase MnBi. It has been found experimentally that a reduction in the magneto-optic Faraday rotation of about 43 percent is associated with the reduced magnetization. As a result, there is a reduction in the "read" signal. (The "read" phase of operation is further described in conjunction with FIG. 3.) This reduction, however, is small and affects the readout signal by only a small margin. Furthermore, utilization of the same intensity light beam as required to write on normal-phase MnBi results in the writing on a larger area of the quenched-phase MnBi film. This larger "bit" of information increases the readout signal so as to more than compensate for the reduction in the quenched-phase magneto-optic Faraday rotation.

Figure 3:
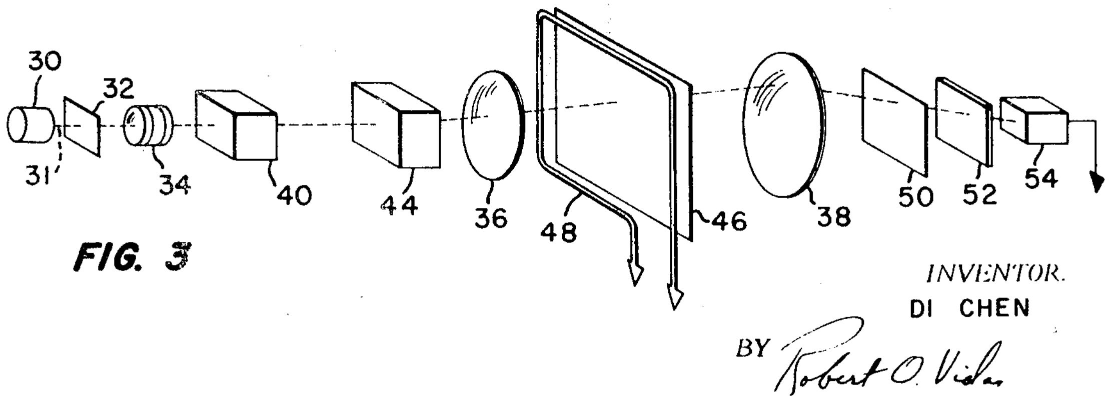
FIG. 3 is a diagrammatic illustration of a light information storage system utilizing quenched-phase magnetic film.

Shown in FIG. 3 is a schematic illustration of an optical memory system utilizing a quenched-phase MnBi film for storing information thereon. The system includes an energy source 30. In the preferred embodiment shown, energy source 30 is a laser. The high intensity and spatial coherence properties of the laser are desirable for information storage applications. However, the present invention can utilize any electromagnetic or other energy source which can provide energy of sufficient intensity to heat the MnBi film to a temperature above it's quenched-phase Curie point. For example, the lower power requirement for "writing" as a result of the reduced Curie temperature makes practical the utilization of an electron beam in the wiring phase of operation. As shown, the system further includes light-polarizing means 32; light-focusing means 34, 36 and 38; light-modulating means 40; light-directing means 44; a quenched-phase MnBi film 46; means 48 for applying a magnetic field to film 46; light-analyzing means 50; light-attenuating means 52, and light-detecting means 54. Modulating means 40 is preferably an electro-optical (E-O) crystal. E-O crystals such as KDP and $LiNbO_3$ are well known for their ability to modulate an incident light beam in response to an applied electric field. Light directing means 44 is preferably nonmechanical and must be capable of providing two-dimensional scanning. Nonmechanical deflectors such as electro-optical (E-O) and acousto-optical (A-O) deflectors which provide two-dimensional light beam deflection are well known in the art. Focusing means 34 is a collimating lens for providing a slightly focused beam on deflector 44. Focusing means 36 and 38 are converging lenses. Polarizer 32 and analyzer 50 are of a type well known in the art. Attenuating means 52 is an E-O shutter, such as a Kerr cell, which allows unimpeded passage of beam 31 in one state and in a second state substantially attenuates the beam. Light detector means 54 is a high-frequency response photodetector.

In operation, laser 30 produces a high intensity, spatially coherent light beam 31. Polarizer 32 linearly polarizes light beam 31. Collimating optics 34 slightly focuses polarized beam 31 to enhance the operation of E-O deflector 44. After traversing through the collimating optics, the light beam is incident upon modulator 40. The modulator is biased in a partially "on" state so as to provide a sufficient light to "read" the stored information utilizing the Faraday effect discussed below. After traversal through modulator 40, light beam 31 is incident upon E-O deflector 44. In response to an applied electric field, E-O deflector 44 deflects beam 31 to a predetermined portion of MnBi film 46. Before deflected beam 31 is incident on film 46, however, the beam traverses through lenses 36 which focuses the beam in the MnBi plane. The focused spot size is on the order of one micrometer.

When it is desired to store information on a predetermined portion of film 46, modulator 40 is switched from the partially "on" state to a state in which beam 31 traverses the modulator unimpeded. In the embodiment shown in FIG. 3, shutter 52 shields detector 54 from the high intensity light beam present when modulator 40 allows unimpeded passage of beam 31. Preferably, synchronizing means (not shown) are provided to simultaneously switch modulator 40 and shutter 52. The energy contained in unimpeded beam 31 is absorbed in a predetermined portion of film 46, rapidly heating the film to a temperature above the quenched-phase Curie temperature of approximately 180° C. With a Gaussian beam having a radius on the order of one micrometer, spots can be written with total laser power in the order of 5 milliwatts using microsecond duration laser pulses. As the preselected portion of film 46 is heated above its quenched-phase Curie temperature, the portion loses its magnetic characteristics. After exposure of the preselected portion to a laser pulse sufficient to heat the portion above the quenched-phase Curie temperature, beam 31 is either reduced in intensity by beam modulator 40 or switched to another portion of the film by deflector 44. The heated portion of the film then cools through the quenched-phase Curie temperature. Upon cooling through the Curie point, the portion becomes magnetized in either a direction parallel or antiparallel to the magnetization direction of the surrounding film dependent upon the existing net magnetic field. The closure flux of the surrounding film area is normally sufficient to align the magnetic vector of the cooled portion in a direction antiparallel to the magnetization direction of the surrounding area. As shown in FIG. 3, the closure flux is aided by an external magnetic field applied to film 46 by coil 48. By heating predetermined portions of film 46 above the quenched-phase Curie temperature so as to reverse the selected portions' magnetization direction, binary information is stored.

The information stored on MnBi film 46 is read utilizing either the magneto-optic Faraday effect or Kerr effect. As shown in FIG. 3, the magneto-optic Faraday effect is utilized. The "reading" phase of operation is similar to that taught in the above-mentioned McGlauchlin et al. patent. Briefly, retrieval of store information is achieved by attenuating the intensity level of beam 31 so that no appreciable temperature rise occurs when the film is exposed to the incident beam. When beam 31 is incident a selected portion of film 46, the beam's plane of polarization is rotated as a function of the orientation of the portion's magnetic vector. For purposes of this specification, assume that analyzer 46 passes a first intensity when the polarization direction of beam 31 is rotated in a direction corresponding to an antiparallel magnetic vector alignment and a second intensity when rotated in a direction corresponding to a parallel magnetic vector alignment. Thus, the magnitude of the signal generated by detector 54 is indicative of the selected portion's magnetization direction. In this manner, retrieval of the information stored in the film 46 is achieved.

Erasure of the store information is obtained by heating a selected portion of the film above the quenched-phase Curie temperature and cooling in the presence of a strong magnetic field. An erasure field of 500 Oersteds is ordinarily sufficient to restore the switched portions of the film to their original magnetization direction.

While this invention has been particularly shown and described with reference to a preferred embodiment thereof, it will be understood by those skilled in the art that changes in form and detail may be made therein without departing from the spirit and the scope of the invention. This is particularly true in relation to the construction and arrangement of the optical elements for providing light beam deflection, modulation, attenuation and focusing.

The embodiments of the invention in which an exclusive property or right is claimed are defined as follows:

1. A system for storing information on magnetic film, comprising:

a quenched-phase magnetic film for storing bits of information on predetermined portions thereof, an energy source for providing energy to heat a predetermined portion of the film to a temperature above the Curie temperature associated with the quenched-phase film, thereby causing a change in the magnetization direction of the predetermined portion upon cooling of the portion below the quenched-phase Curie temperature, and means for directing the energy to the predetermined portion of the film.

2. The information storage system as defined in claim 1 wherein the energy source is an electromagnetic energy source.

3. The information system as defined in claim 1 wherein the energy source is an electron beam source.

4. The information storage system as defined in claim 1 wherein the magnetic material is manganese bismuth.

5. The information storage system as defined in claim 2 wherein the electromagnetic energy source is a laser.

6. The information storage system as defined in claim 2 including means for selectively attenuating the electromagnetic energy to an intensity level insufficient to heat the magnetic film about the quenched-phase Curie temperature so that nondestructive readout is obtained.

7. The information storage system as defined in claim 6 including means for analyzing the attenuated electromagnetic energy after it is incident a selected portion of the magnetic film, the intensity of the electromagnetic energy transmitted by the analyzer being dependent upon the selected portion's magnetization direction.

8. The information storage system as defined in claim 7 wherein the electromagnetic energy source is a laser, the magnetic material is manganese bismuth, and the energy directing means is an electro-optic light beam deflector.

* * * * *